(12) United States Patent
Okazaki et al.

(10) Patent No.: US 9,010,525 B2
(45) Date of Patent: Apr. 21, 2015

(54) SLAT CONVEYOR APPARATUS

(71) Applicant: Nakanishi Metal Works Co., Ltd., Osaka-shi (JP)

(72) Inventors: Yoshihiro Okazaki, Osaka (JP); Haruyuki Yamaguchi, Osaka (JP)

(73) Assignee: Nakanishi Metal Works Co., Ltd., Osaka-Shi (JP)

( * ) Notice: Subject to any disclaimer, the term of this patent is extended or adjusted under 35 U.S.C. 154(b) by 0 days.

(21) Appl. No.: 14/242,205

(22) Filed: Apr. 1, 2014

(65) Prior Publication Data

US 2014/0311866 A1    Oct. 23, 2014

(30) Foreign Application Priority Data

Apr. 17, 2013  (JP) ................................. 2013-086281
Jan. 29, 2014  (JP) ................................. 2014-013931

(51) Int. Cl.
*B65G 17/16*  (2006.01)
*B65G 17/12*  (2006.01)
*B65G 17/06*  (2006.01)
*B65G 39/20*  (2006.01)

(52) U.S. Cl.
CPC .............. *B65G 17/123* (2013.01); *B65G 17/16* (2013.01); *B65G 17/067* (2013.01); *B65G 39/20* (2013.01)

(58) Field of Classification Search
USPC ................ 198/475.1, 797, 798, 800
See application file for complete search history.

(56) References Cited

U.S. PATENT DOCUMENTS

| | | | | |
|---|---|---|---|---|
| 2,493,857 A | * | 1/1950 | Cargill ........................... | 198/798 |
| 2,893,538 A | * | 7/1959 | Buttironi et al. .............. | 198/795 |
| 3,243,032 A | * | 3/1966 | Chambon ................... | 198/465.3 |
| 3,260,351 A | * | 7/1966 | Miller ........................... | 198/799 |
| 3,515,261 A | * | 6/1970 | Before et al. ................. | 198/802 |
| 5,060,779 A | * | 10/1991 | Landaeus ...................... | 198/321 |
| 7,537,100 B2 | * | 5/2009 | Mustalahti et al. ........... | 198/321 |

FOREIGN PATENT DOCUMENTS

| JP | S45-13613 | 5/1970 |
|---|---|---|
| JP | 2012-158396 A1 | 8/2012 |

* cited by examiner

*Primary Examiner* — Mark A Deuble
(74) *Attorney, Agent, or Firm* — Kratz, Quintos & Hanson, LLP

(57) ABSTRACT

To provide a slat conveyor apparatus in which course change path parts are moved without inverting the upper and lower sides of slats to eliminate the need for an expensive pitting work, wherein the slats can be held horizontally by a simplified configuration on the course change path parts at front and back ends in the direction of conveyance, whereby the length of the working process does not become shorter, and a required inverting action can be made by a simplified configuration.

Endless chains 2C are connected to front ends of the slats 3 in a traveling direction F, a supported means B to be supported at the course change path parts C1 is provided to back ends of the slats 3 in the traveling direction F, a movable supporting means C is provided to the course change path parts C1 to support the supported means B from below and hold the slats 3 in the horizontal posture, and the movable supporting means C repeatedly travels back and forth in the vertical direction in conjunction with movement of the endless chains 2C and moves to a position at which to support the supported means B from below only when the supported means B passes through the course change path parts C1.

8 Claims, 12 Drawing Sheets

SLAT CONVEYOR APPARATUS

TECHNICAL FIELD

The present invention relates to slat conveyor apparatuses that have a vertical circulation path in which a conveyance path part and a return path part linearly arranged one above the other are connected at end portions thereof by course change path parts to convey subjects to be conveyed by the conveyance path part while moving a large number of slats by endless chains, and move the slats on the course change path parts without inverting the upper and lower sides of the slats.

BACKGROUND ART

Slat conveyor apparatuses that have a vertical circulation path in which a conveyance path part and a return path part linearly arranged one above the other are connected at end portions thereof by course change path parts, to convey subjects to be conveyed by the conveyance path part while moving a large number of slats along the vertical circulation path, eliminate the need to provide a separate return path part for empty carts, thereby resulting in space savings in a factory.

One of the slat conveyor apparatuses is configured such that the course change path parts are made movable without inverting the upper and lower sides of the slats to reduce the diameter of front and back sprockets over which the endless chains are extended, thereby to decrease the height of the apparatus and eliminate expensive pitting work (excavation of the ground) (for example, refer to Patent Document 1).

At the slat conveyor apparatus described in Patent Document 1, coupling pins protruded inward from right and left sides endless chains are inserted into connection holes on the front sides of right and left surfaces of the slats while the slats move on the conveyance path part to connect rotatably the slats to the endless chains, and a plate-like frame is separated from the floor surface by a larger distance than the thickness of the slats, and the slats are moved one by one from the conveyance path part to the return path part without inverting the upper and lower sides of the slats at a front-side end portion downstream of the direction of conveyance of the plate-like frame, and the slats are moved one by one from the return path part to the conveyance path part without inverting the upper and lower sides of the slats at a back-side end portion upstream of the direction of conveyance of the frame.

There is also a two-tier parking apparatus configured to move palettes on which automobiles are placed without inverting the upper and lower sides of the palettes along a vertical circulation track formed by an upper straight track, a lower straight track, and course change tracks connecting the end portions of the former tracks, wherein the front ends of the palettes are pivotally supported at chain levers that are attached at regular intervals to endless chains so as to protrude outward, guide rollers attached to the back ends of the palettes are run on guide rails provided along the endless chains, and a feed lever is rotated to convey the palettes while supporting a shaft provided to the palettes to move up and down the palettes held horizontally on the course change tracks (for example, refer to Patent Document 2).

CITATION LIST

Patent Literatures

Patent Document 1: JP-A No. 2012-158396
Patent Document 2: JP-B No. S45-013613

SUMMARY OF INVENTION

Technical Problem

In the configuration of the slat conveyor apparatus as disclosed in Patent Document 1, the slats are not held horizontally at the front and back ends in the direction of conveyance, and thus the length of portions of the slats held horizontally capable of conveying a subject to be conveyed (the length of a working process) becomes shorter.

In addition, since the slats fall from the plate-like frame at the front end in the direction of conveyance, impact force acts repeatedly on the slats and may break the slats.

Further, the slats have no rollers for receiving load and the back-side ends of the slats slide over the upper surface of the plate-like frame, which results in abrasion and noise.

Moreover, in the case of recovery from a pinch accident by temporary inversion or conducting work with forward and backward movements, a required inverting action cannot be made.

In the configuration of a two-tier parking apparatus as disclosed in Patent Document 2, the feed lever rotates to move up and down the palettes held horizontally on the course change track at the front and back ends, and thus it is necessary to provide guide rails (16 and 17) to prevent the slats from falling from the feed lever when the feed lever is situated in the lower position.

In addition, it is necessary to provide open/close levers (18 and 19) for prevention of interference at the intersection of the shaft (7) provided in the palettes and the guide rails (16 and 17).

Further, for the palettes to make the foregoing inverting action, a complicated mechanism (see FIGS. 8 and 9) is required such as a lower open/close device.

Moreover, since one end each of the palettes is supported by the chain roller via the shaft in the palettes and the chain lever, half of the weight of a subject to be conveyed (automobile) acts on the chain roller and the remaining half of the weight of the subject to be conveyed acts on the feed lever. It is thus necessary to increase the strength of the feed device including the feed lever, and it is not possible to make the feed device compact.

Furthermore, since the chain roller bears the load of the slats, the chain roller is required to have strength for bearing not only tension but also the half of the weight of the subject to be conveyed. This makes the chain roller larger in size.

In the case of using a slat conveyor apparatus of the same configuration as that of a two-tier parking device as disclosed in Patent Document 2, it is necessary to minimize gaps between the slats to avoid that a worker's leg gets caught in the slats on the upper surfaces thereof and prevent that a part or a tool dropping through a gap from a worker is pinched in the endless chains. It is also necessary to make the slats thick if a subject to be conveyed is large in weight.

However, when the slats are made thick with minimum gaps therebetween, there arises a problem that the slats interfere with each other on the course change path parts at the front and back ends of the conveyance path parts.

In light of the foregoing circumstances, an object of the present invention is to provide a slat conveyor apparatus in which course change path parts are moved without inverting the upper and lower sides of slats to eliminate the need for an expensive pitting work, wherein the slats can be held horizontally by a simplified configuration on the course change path parts at front and back ends in the direction of conveyance, whereby the length of the working process does not become shorter, no impact is exerted repeatedly, or the slats do not slide, and in the case of recovering from a pinch accident by temporary inversion or conducting work with forward and backward movements, a required inverting action can be made by a simplified configuration, and chain rollers in endless chains do not need to be made larger in size, and even if a subject to be conveyed is large in weight, the slats do not interfere with each other at the course change path parts.

Solution to Problem

To solve the foregoing issue, a slat conveyor apparatus according to the present invention is configured to have a vertical circulation path in which a conveyance path part and a return path part linearly arranged one above the other are connected at end portions thereof by course change path parts to convey a subject to be conveyed by the conveyance path part while moving a large number of slats by endless chains, and move the slats on the course change path parts without inverting the upper and lower sides of the slats, wherein the endless chains are connected to either one of front and back ends of the slats in a traveling direction and a supported means to be supported at the course change path parts is provided to the other ends of the slats, a movable supporting means is provided to at least one of the course change path parts at front and back sides of the traveling direction of the slats to support the supported means from below and hold the slats in the horizontal posture, and the movable supporting means repeatedly travels back and forth in the vertical direction between the end portion of the conveyance path part and the end portion of the return path part in conjunction with movement of the endless chains and moves to a position at which to support the supported means from below only when the supported means passes through the course change path parts.

According to the foregoing configuration, the movable supporting means is provided to at least one of the course change path parts at the front and back sides of the traveling direction of the slats to repeatedly travel back and forth in the vertical direction between the end portion of the conveyance path part and the end portion of the return path part and move to a position at which to support the supported means from below only when the supported means in the slats passes through the course change path parts and hold the slats in the horizontal posture, and it is thus possible to hold the slats horizontally by a simplified configuration.

Accordingly, the length of the working process does not become shorter, no impact is repeatedly exerted unlike in the invention of Patent Document 1, and the slats do not slide.

In addition, there is no need to provide guide rails at the course change path parts unlike in the invention of Patent Document 2, and thus there is also no need to provide an open/close lever for prevention of interference at the intersection of the shaft in the slats and the guide rails unlike in the invention of Patent Document 2.

Further, since no guide rails are provided unlike in the invention of Patent Document 2 and the movable supporting means moves to a position at which to support the supported means in the slats from below only when the supported means passes through the course change path parts, it is possible to make an inverting action without having to provide such a complicated mechanism as the lower open/close device described in Patent Document 2.

Moreover, since the movable supporting means operates in conjunction with movement of the endless chains, the movable supporting means is also driven by the drive device for the endless chains, which eliminates the need to provide a separate drive device for the movable supporting means.

It is preferred that the supported means is a roller, and the movable supporting means is configured to support the roller by a free end portion of a lever that is axially supported at a base end thereof and is swung back and forth by a cam.

According to this configuration, the supported means provided in the slats is a roller and thus the slats operate smoothly without a hitch or abrasion, and the movable supporting means is configured to support the roller by the free end portion of the lever that is axially supported at the base end and is swung back and forth by the cam, which enables stable and reliable operations by a simplified cam mechanism.

It is also preferred that load-receiving rollers are provided at front, back, right, and left sides of the lower surfaces of the slats, and the load-receiving rollers are supported by guide rails disposed at the conveyance path part.

According to this configuration, the load-receiving rollers are supported by the guide rails at the upper conveyance path part, and thus no load acts on the supported means (roller) in the slats, which makes it possible to reduce the supported means (roller) in size.

Therefore, the movable supporting means (lever that is axially supported at the base end thereof and is swung back and forth by the cam) can be made compact, and it is possible to manufacture the apparatus in low-floor fashion and at lower costs.

In addition, the load of the slats is borne by the guide rails, not the chain rollers, at the conveyance path part, and thus the chain rollers are subjected to only tension. This makes it possible to reduce the chains in size and reduce manufacturing costs.

Further, the load-receiving rollers are provided at the front, back, right, and left sides of the lower surfaces of the slats, and thus even if any foreign object or liquid drops from above to the slats, it does not fall on the load-receiving rollers, which makes it possible to prevent abrasion and corrosion of the load-receiving rollers.

It is also preferred that the slats are each formed by a steel plate rectangular in a plane view having side plates folded at a sharp angle at the front and back sides of the traveling direction, and coupling position between the slats and the endless chains is offset more outward than the line connecting the centers of coupling pins for coupling link plates of the endless chains.

According to this configuration, the slats are each formed by the steel plate rectangular in a plane view having the side plates folded at a sharp angle at the front and back sides of the traveling direction, and thus the folded structure of the steel plate makes it easy to manufacture the slats, and even if a subject to be conveyed is large in weight, the slats can be relatively made lightweight while maintaining desired strength and rigidity.

In addition, since the side plates of the slats at the front and back sides of the traveling direction are folded at a sharp angle, it is possible to, even if a subject to be conveyed is large in weight, provide space between the slats at the course change path parts while maintaining desired strength and rigidity as described above.

Further, since the coupling position between the slats and the endless chains is offset more outward than the line connecting the centers of the coupling pins for coupling the link plates of the endless chains, the preceding slats can move at a higher speed at the course change path parts to widen gaps from the following slats, which makes it possible to avoid interference between the slats.

Advantageous Effects of Invention

As described above, according to the slat conveyor apparatus in the present invention, it is possible to produce significant advantages as follows: (a) the slats can be held horizontally, and thus the length of the working process does not become shorter, no impact is repeatedly exerted, and the slats do not slide; (b) there is no need to provide guide rails at the course change path parts, and thus there is also no need to provide an open/close lever for prevention of interference at the intersection of the shaft in the slats and the guide rails; (c) since no guide rails are provided at the course change path part and the movable supporting means moves to a position at which to support the supported means in the slats from below only when the supported means passes through the course change path parts, it is possible to make an inverting action without having to provide such a complicated mechanism; (d) according to the configuration of the movable supporting means to support the roller as supported means by a free end portion of a lever that is axially supported at a base end thereof and is swung back and forth by a cam, stable and reliable operations can be realized by a simplified cam mechanism; (e) according to the configuration in which the load-receiving rollers are supported by the guide rails at the upper conveyance path part, the supported means can be reduced in size and the movable supporting means can be made compact, and it is thus possible to manufacture the apparatus in low-floor fashion and at lower costs, and the chain roller is subjected to only tension and it is thus possible to reduce the chain in size and reduce manufacturing costs; and (f) according to the configuration in which the slats are each formed by the steel plate rectangular in a plane view having the side plates folded at a sharp angle at the front and back sides of the traveling direction and the coupling position between the slats and the endless chains is offset outward, it is possible to avoid interference between the slats even if a subject to be conveyed is large in weight, and the like.

DESCRIPTION OF EMBODIMENTS

In this specification, front, back, right, and left sides are defined along direction of conveyance F (from upstream to downstream) of a conveyance path part T, and the front view is seen from the right side.

Figure 1:
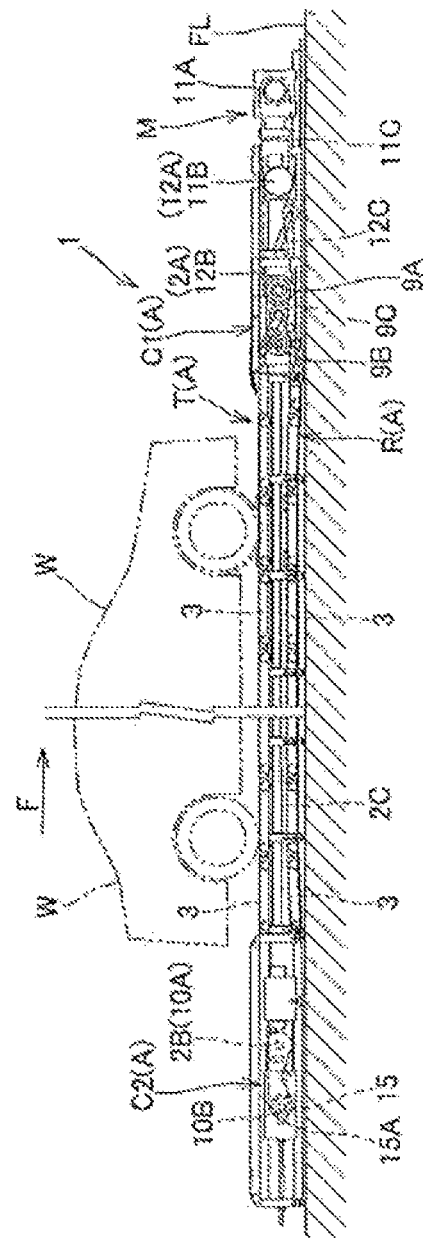
FIG. 1 is a front view of a slat conveyor apparatus in an embodiment of the present invention.

As shown in the front view of FIG. 1, a slat conveyor apparatus 1 in an embodiment of the present invention includes a vertical circulation path A in which the conveyance path part T and a return path part R linearly arranged one above the other are connected at end portions thereof by a course change path part C1 on the downstream side of the direction of conveyance F and a course change path part C2 on the upstream side of the direction of conveyance F, and conveys a subject to be conveyed W on the conveyance path part T while moving a large number of slats 3, 3, ... by endless chains 2C extended over a sprocket 2A on the downstream side of the direction of conveyance F and a sprocket 2B on the upstream side of the direction of conveyance F. If the subject to be conveyed W is a tire-equipped vehicle body, it is not necessary to install a special connecting device at the entrance and exit of the working process but the subject to be conveyed can make connections by rolling motion of the tires.

In addition, the slat conveyor apparatus 1 is capable of moving the slats 3, 3, ..., on the course change path parts C1 and C2 without having to inverting the upper and lower sides of the slats 3, 3, ..., which makes it possible to reduce the diameter of the front and back sprockets 2A and 2B over which the endless chains 2C are extended. Accordingly, it is possible to install the apparatus with a low height on a floor surface FL, which eliminates the need for an expensive pitting work (excavation of the ground).

Figure 4:
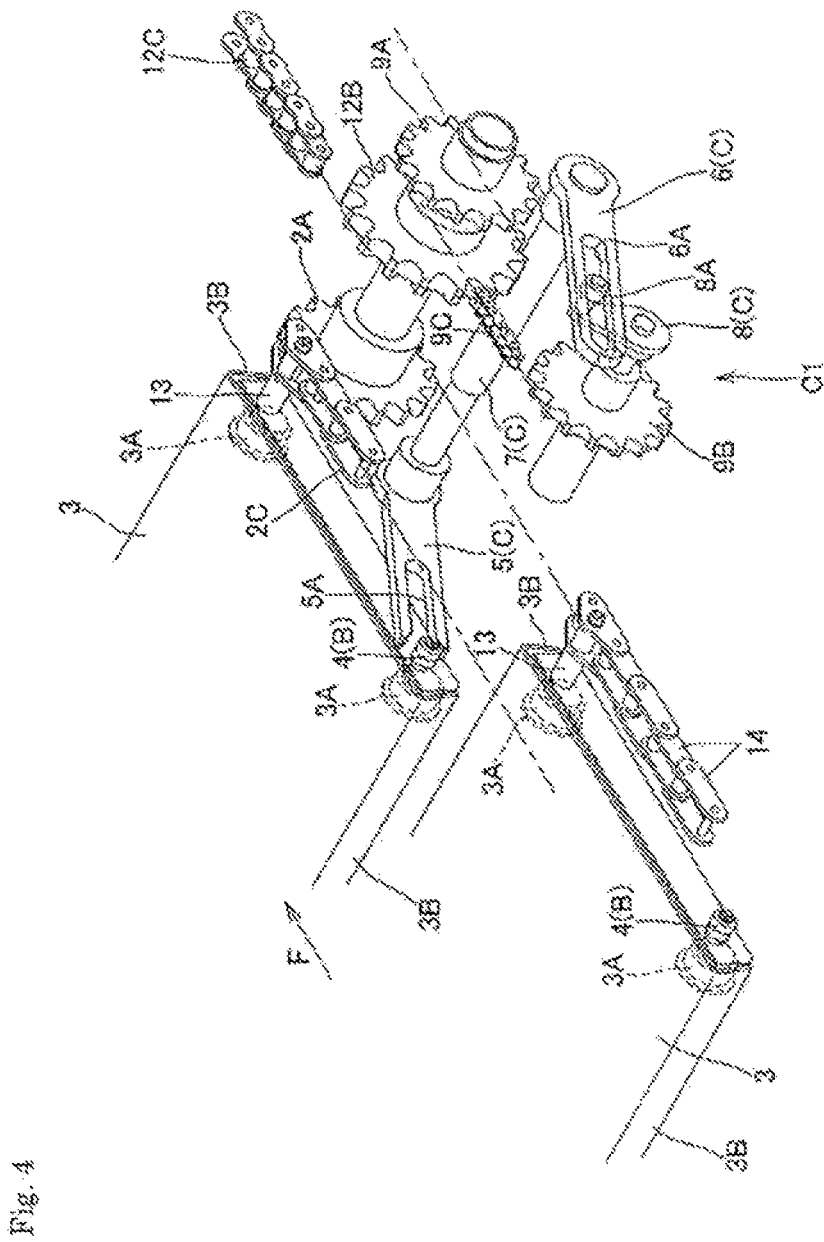
FIG. 4 is a schematic perspective view of a configuration example of a movable supporting means.
Figure 5:
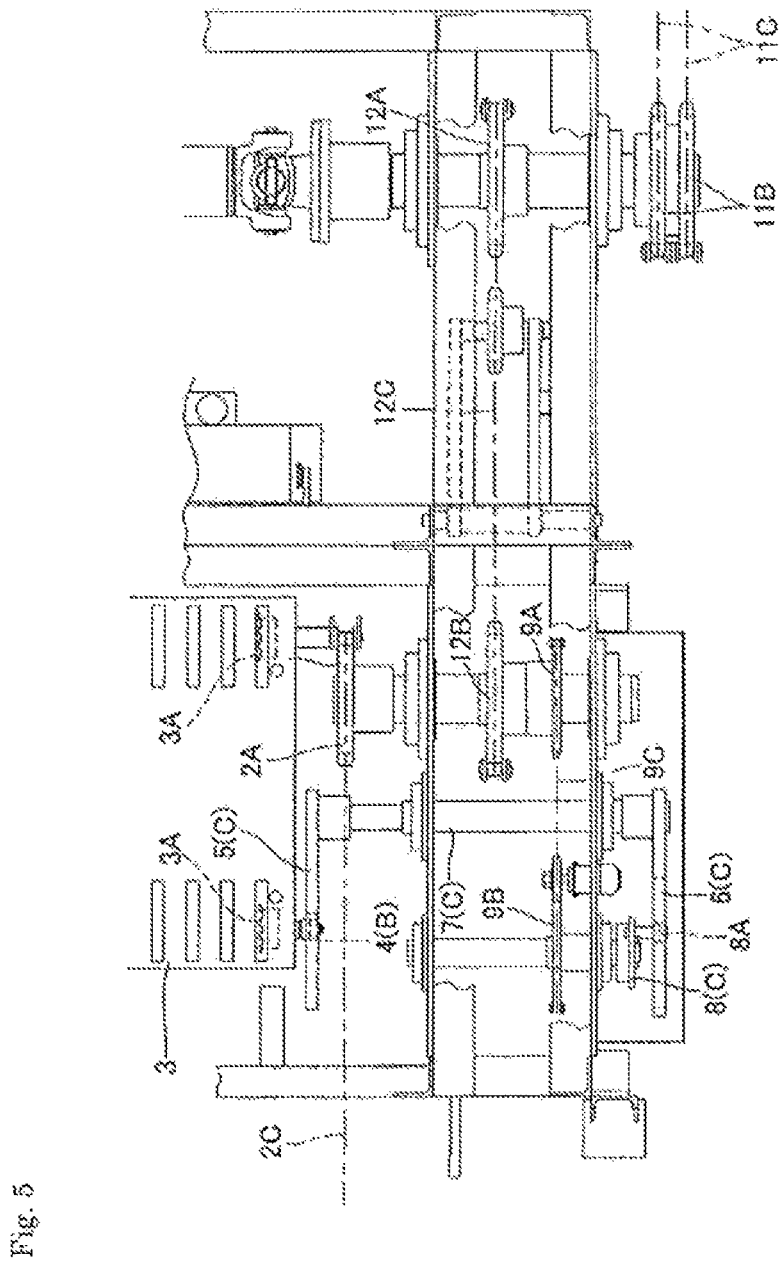
FIG. 5 is a schematic planar view of the same.
Figure 6:
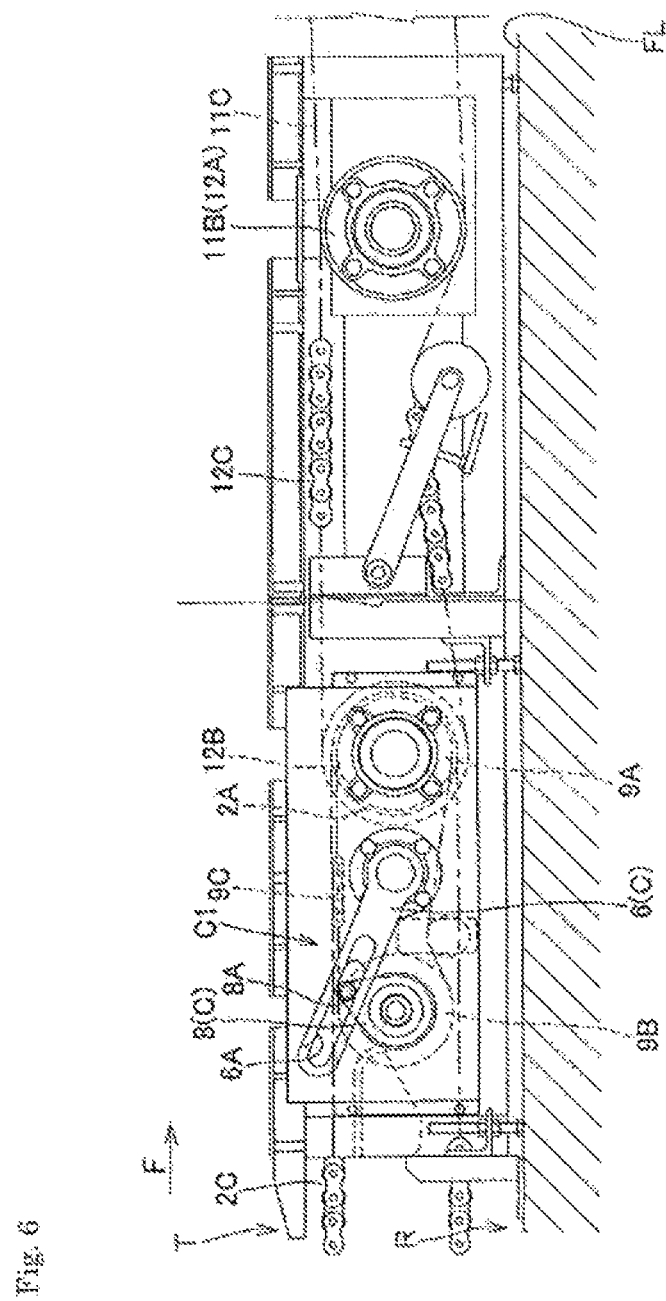
FIG. 6 is a schematic front view of a partial vertical section of the same.

As shown in the front view of FIG. 1, the schematic perspective view of FIG. 4, the schematic planar view of FIG. 5, and the schematic front view of the partial vertical section of FIG. 6, an output shaft of a decelerator-equipped motor M is coupled to a drive input sprocket 11A, and thus power of the decelerator-equipped motor M is transferred from the drive input sprocket 11A to a drive input sprocket 11B via a drive input chain 11C.

In addition, a drive sprocket 12A is concentrically coupled to the drive input sprocket 11B, and the power is transferred from the drive sprocket 12A to a drive sprocket 12B via a drive chain 12C. The sprocket 2A on the downstream side of the direction of conveyance F is concentrically coupled to the drive sprocket 12B to drive the endless chains 2C. As shown in the schematic side view of the vertical section (as seen from the front side) of FIG. 2 and the planar view of FIG. 3(a), the endless chains 2C for driving the slats 3, 3, ... are disposed on both right and left sides of the traveling direction of the slats 3, 3, ....

Figure 2:
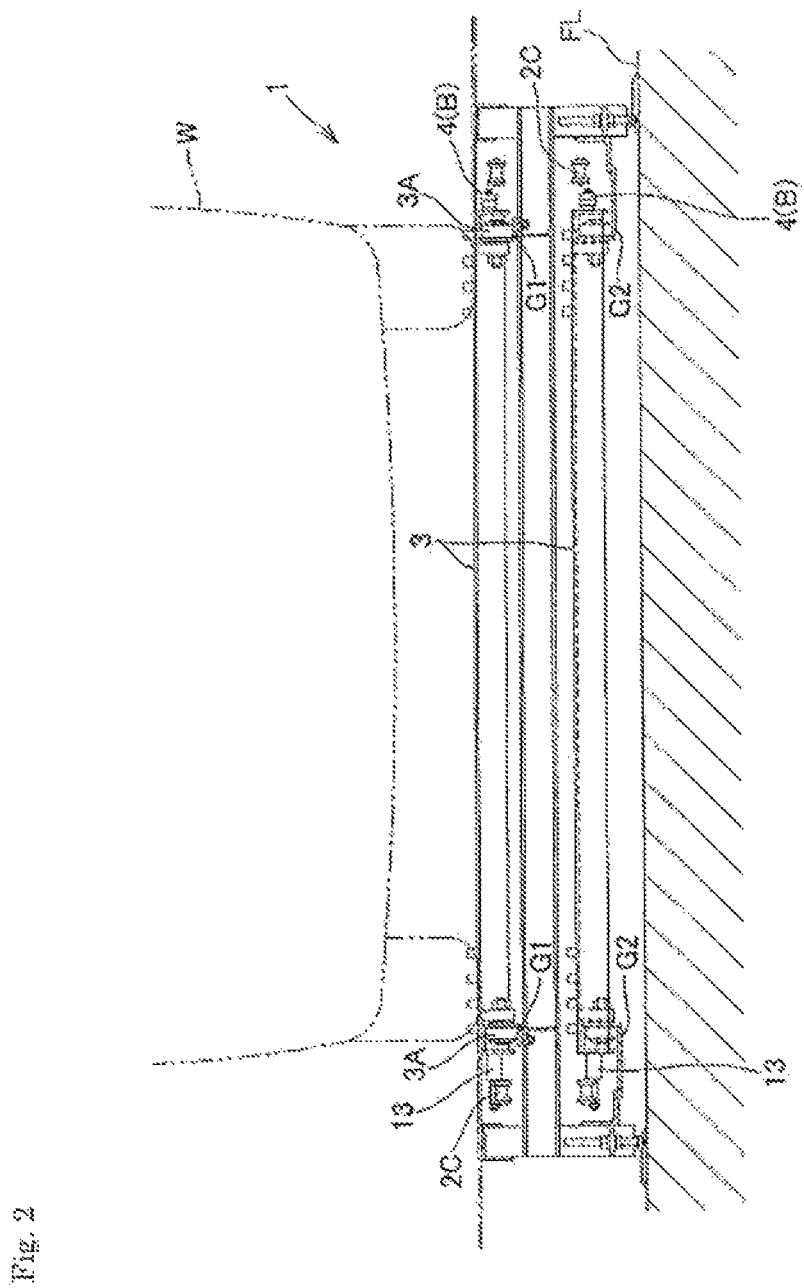
FIG. 2 is a schematic side view of a vertical section of the same (as seen from the front side)
Figure 3:
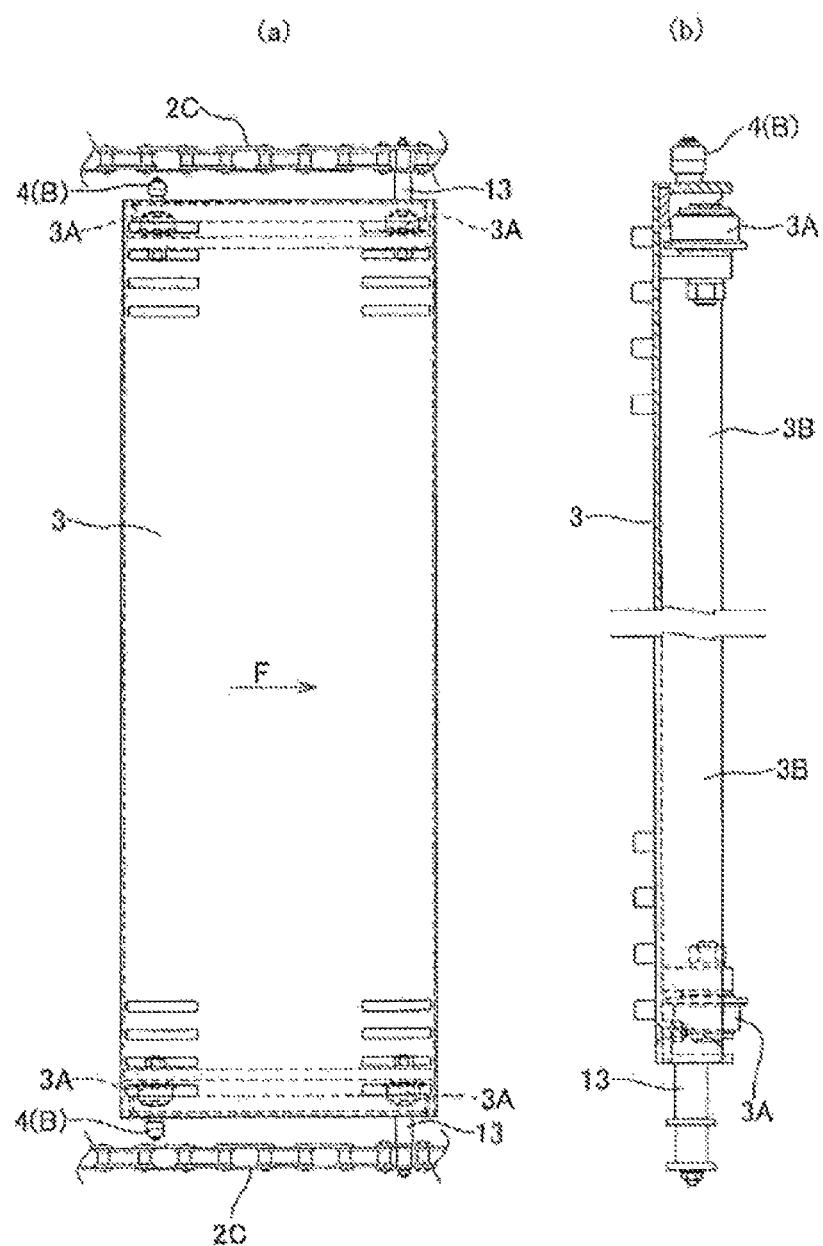
FIG. 3(a) is a schematic planar view of a slat and FIG. 3(b) is an enlarged side view of a partial vertical section of the slat (as seen from the front side)

As shown in the schematic side view of the vertical section (as seen from the front side) of FIG. 2, the planar view of FIG. 3(a), the side view of the partial vertical section (as seen from the front side) of FIG. 3(b), and the schematic perspective view of FIG. 4, end portion coupling shafts 13 are protruded to the right and left from the front end portions of the slats 3 along the direction of conveyance F and are coupled to the right and left endless chains 2C and 2C. Thus, the slats 3, 3, ... move together with the endless chains 2C.

Load-receiving rollers 3A, 3A, ... are provided on the front, back, right, and left sides of the lower surfaces of the slats 3. The load-receiving rollers 3A, 3A, ... are supported by right and left guide rails G1 and G1 at the conveyance path part T, and are supported by right and left guide rails G2 and G2 at the return path part R.

In addition, rollers 4 and 4 as supported means B supported at the course change path parts C1 and C2, are axially supported at the right and left sides of the back ends of the slats 3 along the direction of conveyance F.

Next, detailed descriptions will be given as to a movable supporting means C disposed at the course change path part C1 on the downstream side of the direction of conveyance F. The movable supporting means C may be provided on both right and left sides of the slats 3 or may be provided only on right or left side of the slats 3.

As shown in the schematic perspective view of FIG. 4, the movable supporting means C is formed by right and left swing levers 5 and 6, a coupling shaft 7 for coupling these levers, and a cam 8, and the like.

The cam 8 rotates in conjunction with movement of the endless chain 2C via an interlock sprocket 9A concentric to the sprocket 2A, an interlock chain 9C, and an interlock sprocket 9B, and then a cam roller 8A of the cam 8 moves through a long hole 6A of the swing lever 6. Accordingly, the swing lever 6 as a cam follower swings repeatedly in the vertical direction, and the swing lever 5 also swings repeatedly in the vertical direction.

Specifically, the swing levers 5 and 6 are axially supported at base end portions thereof, and are repeatedly swung back and forth by the cam 8 in conjunction with movement of the endless chain 2C.

Figure 7:
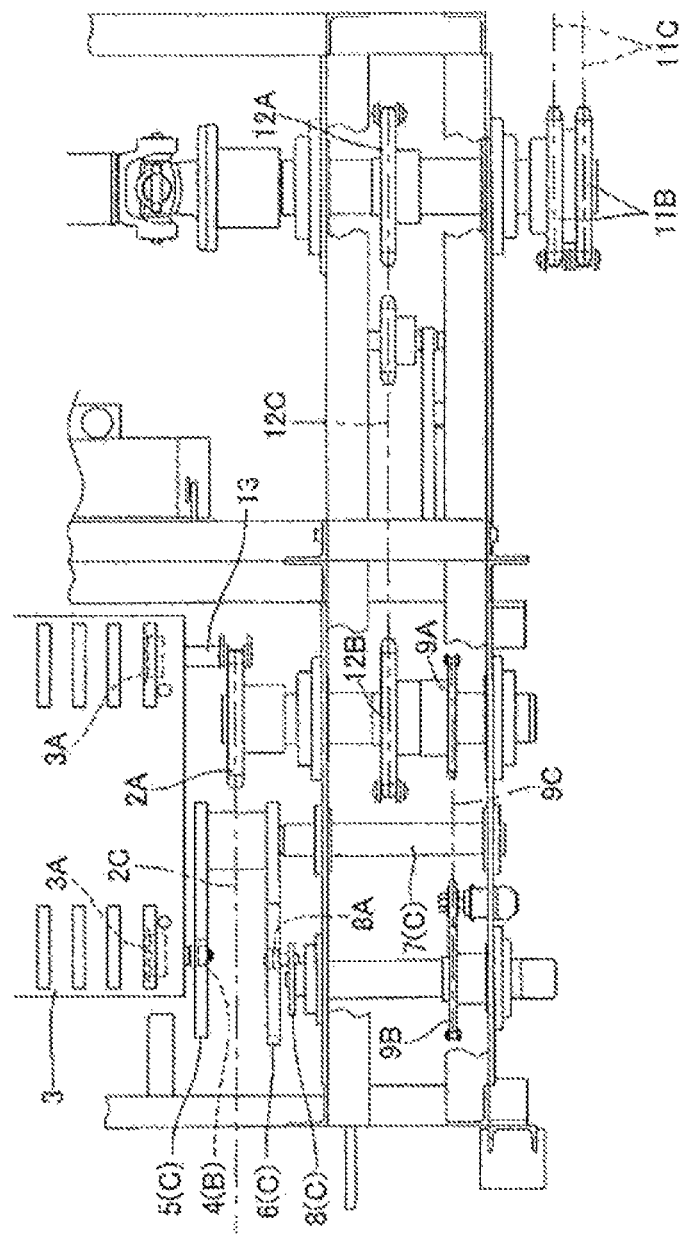
FIG. 7 is a schematic planar view of a modification example of the movable supporting means.

As shown in the schematic planar view of FIG. 7, when the swing lever 6 is disposed next to the swing lever 5, the swing levers 5 and 6 can be easily aligned in position (phase).

Next, operations of the slat 3 at the course change path part C1 on the downstream side of the direction of conveyance F will be described with reference to the schematic front views for describing operations of FIGS. 8 and 9.

As seen from the figures (a), (a') (b), and (b'), the slats 3 are situated in the same positions at the course change path part C1.

Figure 8:
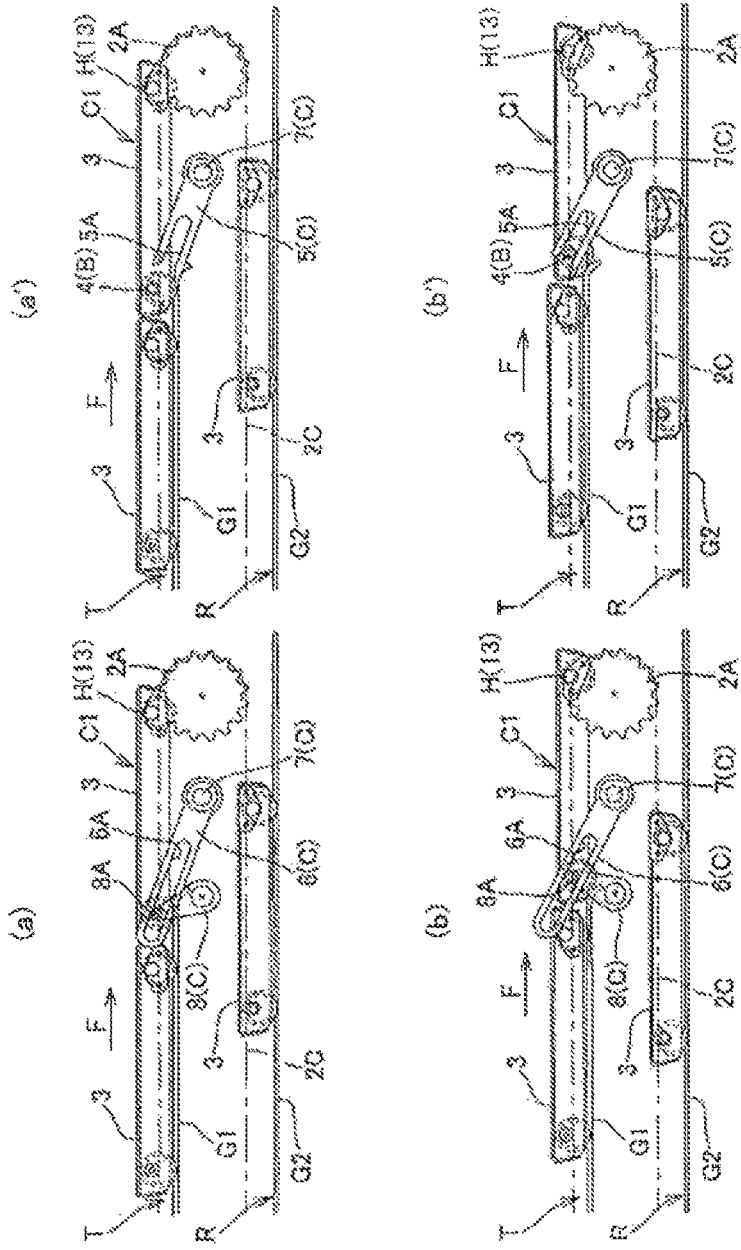
FIG. 8 is a schematic front view for describing operations of a course change path part on the downstream side of the direction of conveyance.

In addition, FIGS. 8(*a*), 8(*b*), 9(*a*), and 9(*b*) indicate the relationship between the swing lever 6 constituting the movable supporting means C and the cam 8, and FIGS. 8(*a'*), 8(*b'*), 9(*a*), and 9(*b'*) indicate the relationship between the swing lever 5 constituting the movable supporting means C and the roller 4 as supported means B.

When the slat 3 enters from the conveyance path part T into the course change path part C1 as shown in FIGS. 8(*a*) and 8(*a'*) and the end portion coupling shaft 13 descends along the sprocket 2A as shown in FIGS. 8(*b*) and 8(*b'*), the roller 4 enters into a cut-out 5A in the free end portion of the swing lever 5 (refer to FIG. 4) repeatedly swinging in the vertical direction together with the swing lever 6, and thus the roller 4 is supported by the movable supporting means C (swing lever 5).

Figure 9:
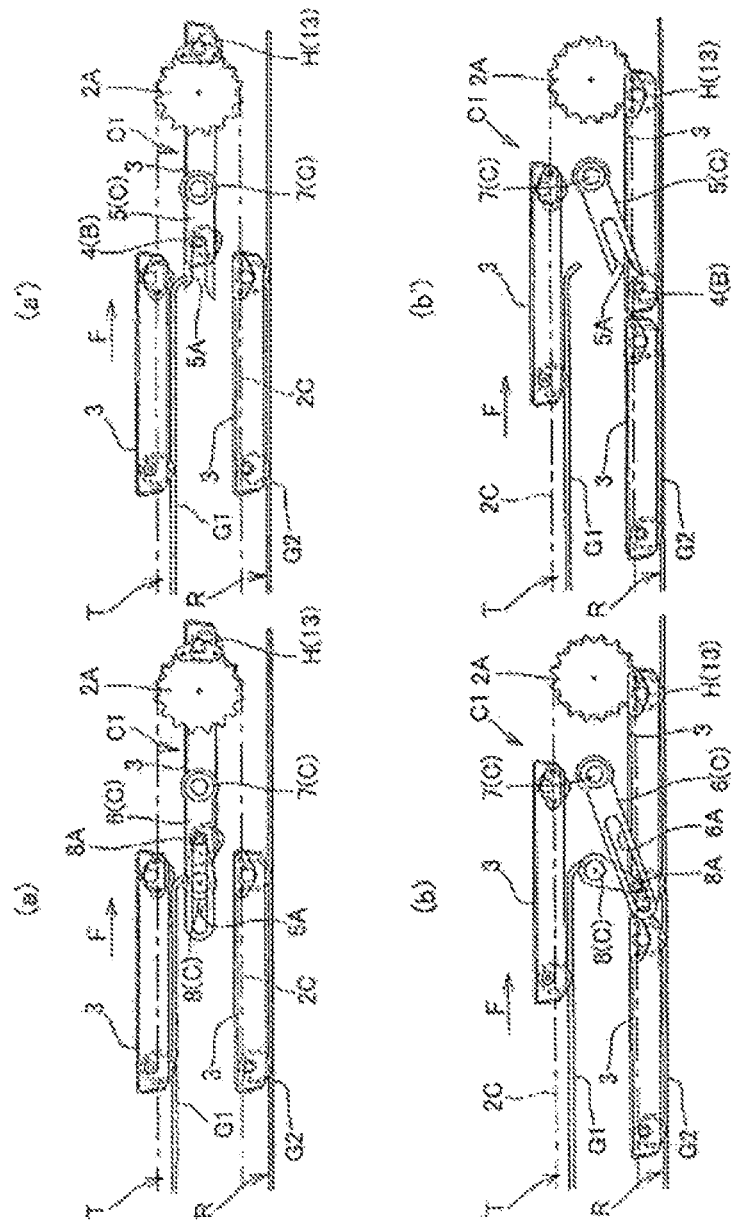
FIG. 9 is a schematic front view for describing operations of the same.

When turning from the states shown in FIGS. 8(*b*) and 8(*b'*) through the states shown in FIGS. 9(*a*) and 9(*a'*) to the states shown in FIGS. 9(*b*) and 9(*b'*), the slat 3 is lowered in the horizontal posture while the roller 4 is supported by the movable supporting means C (swing lever 5). Then, the slat 3 moves from the course change path part C1 to the return path part R, and the roller 4 removes from the cut-out 5A in the swing lever 5.

As described above, the movable supporting means C (swing lever 5) repeatedly travels back and forth in the vertical direction between the end portion of the conveyance path part T and the end portion of the return path part R in conjunction with movement of the endless chain 2C, and moves to a position at which to support the supported means B (roller 4) from below only when the supported means B passes through the course change path part C1.

In the embodiment, the movable supporting means C is configured to support the supported means B (roller 4) by the free end portion of the swing lever 5 that is axially supported at the base end portion thereof and is repeatedly swung by the cam 8. Alternatively, the movable supporting means C may be configured to support the supported means B (roller 4) by a lever reciprocating linearly in the vertical direction in the horizontal state.

Figure 10:
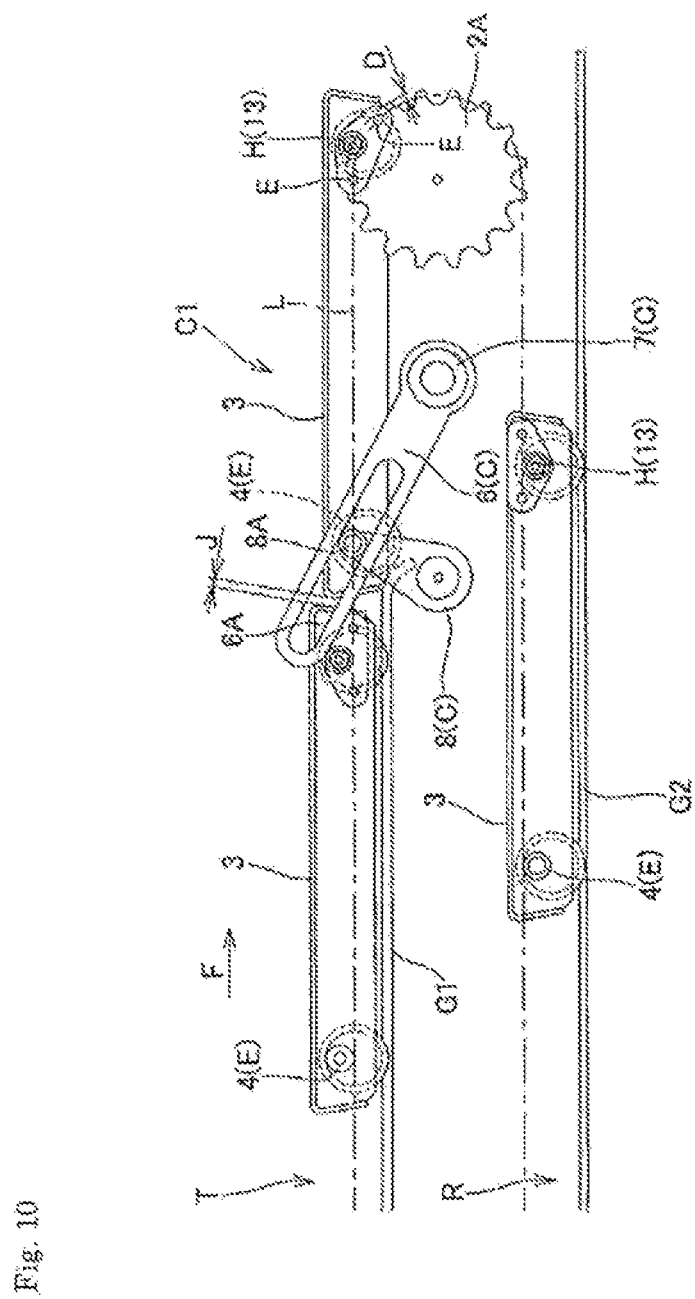
FIG. 10 is a schematic enlarged front view of a course change path part in one state on the downstream side of the direction of conveyance.

As shown in the schematic perspective view of FIG. 4 and the schematic front view of FIG. 10, the slats 3 are each formed by a steel plate rectangular in a planar view having side plates 3B and 3B folded at a sharp angle at the front and back sides of the traveling direction. By the steel plate folded structure, it is possible to easily manufacture the slats 3 and make the slats 3 relatively lightweight while maintaining desired strength and rigidity even if the subject to be conveyed W is large in weight.

In addition, since the side plates 3B and 3B of the slats 3 at the front and back sides of the traveling direction are folded at a sharp angle, it is possible to provide a gap J between the slats at the course change path parts C1 and C2.

Further, as shown in the schematic front view of FIG. 10, coupling position H between the slat 3 and the endless chain 2C is offset more outward than a line L connecting centers E, E, . . . of coupling pins for coupling link plates 14, 14, . . . (refer to FIG. 4) of the endless chain 2C (refer to D in FIG. 10). This increases the speed of the slat 3 moving earlier at the course change path parts C1 and C2, and thus the gap from the following slat 3 becomes further wider to avoid interference between the slats.

Next, a configuration example of the course change path part C2 on the upstream side of the direction of conveyance F will be described.

Figure 11:
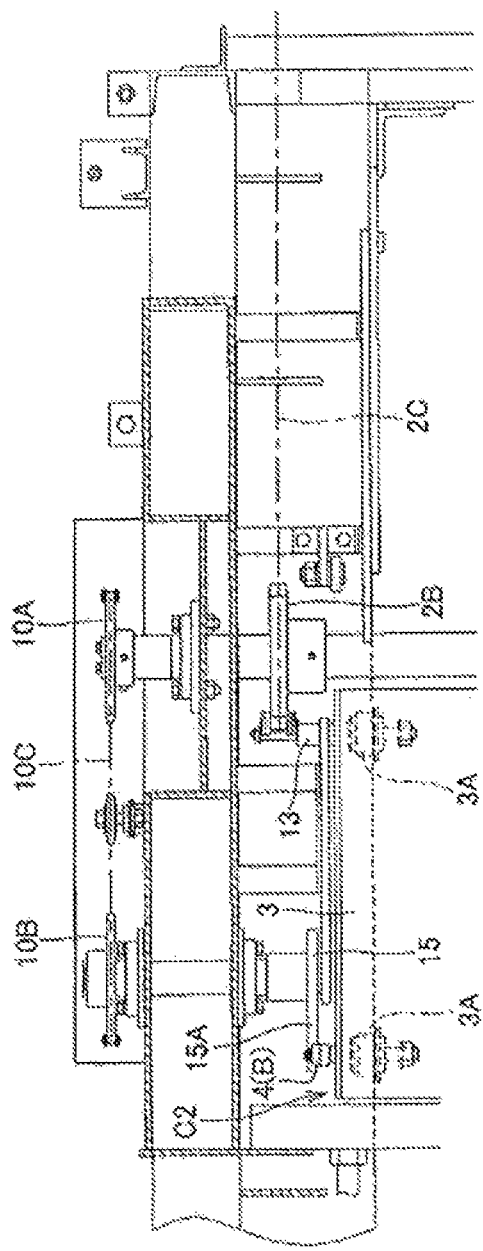
FIG. 11 is a schematic planar view of a traverse section of a course change path part and its surroundings on the upstream side of the direction of conveyance.

As shown in the front view of FIG. 1 and the schematic planar view of the traverse section of FIG. 11, a spinning disk 15 with a projection 15A projecting outward in the radial direction rotates in conjunction with movement of the endless chain 2C, via an interlock sprocket 10A concentric to the sprocket 2B on the upstream side of the direction of conveyance F, an interlock chain 10C, and an interlock sprocket 10B.

Figure 12:
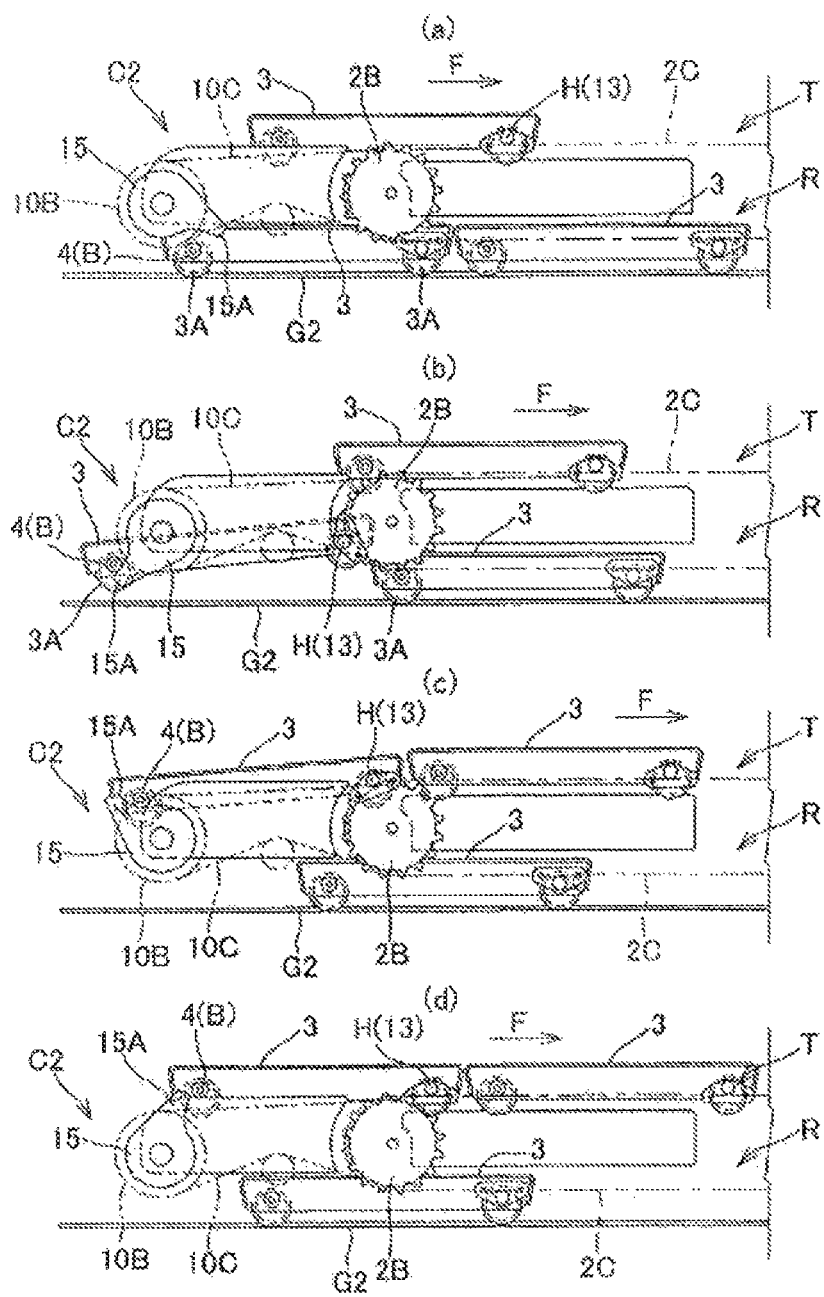
FIG. 12 is a schematic front view for describing operations of the course change path part on the upstream side of the direction of conveyance.

Referring to the schematic front view for describing operations of FIG. 12, operations of the slat 3 at the course change path part C2 on the upstream side of the direction of conveyance F will be described. When the slat 3 enters from the return path part R into the course change path part C2 as shown in FIG. 12(*a*) and the end portion coupling shaft 13 rises along the sprocket 2B as shown in FIG. 12(*b*), the roller 4 as supported means B of the slat 3 is raised by the projection 15A of the spinning disk 15. Thus, the slat 3 rises, turning from the state shown in FIG. 12(*b*) through the state shown in FIG. 12(*c*) to the state shown in FIG. 12(*d*). Accordingly, the slat 3 moves from the course change path part C2 to the conveyance path part T, and then the roller 4 separates from the projection 15A.

In the configuration using the spinning disk 15, it is impossible to raise (descend in the case of an inverting operation) the slat 3 in the horizontal posture. Thus, when it is necessary to raise the slat 3 in the horizontal posture even at the course change path part C2 on the upstream side of the direction of conveyance F, as with the course change path part C1 on the downstream side of the direction of conveyance F, the movable supporting means C is configured to repeatedly travel back and forth in the vertical direction between the end portion of the conveyance path part T and the end portion of the return path part R in conjunction with movement of the endless chain 2C and move to a position at which to support the supported means B (roller 4) from below only when the supported means B passes through the course change path part C2.

According to the thus configured slat conveyor apparatus 1, the movable supporting means C is provided at one or both of the course change path parts C1 and C2 at the front and back sides of the traveling direction of the slats 3, 3, . . . to repeatedly travel back and forth in the vertical direction between the end portion of the conveyance path part T and the end portion of the return path part R and move to a position at which to support the supported means B (roller 4) provided in the slat 3 from below only when the supported means B passes through the course change path part, thereby to hold the slat 3 in the horizontal posture, and thus it is possible to hold the slat 3 horizontally by a simplified configuration.

Accordingly, the length of the working process does not become shorter, no impact is repeatedly exerted unlike in the invention of Patent Document 1, and the slats 3, 3, . . . do not slide.

In addition, there is no need to provide guide rails at the course change path parts C1 and C2 unlike in the invention of Patent Document 2, and thus there is also no need to provide an open/close lever for prevention of interference at the intersection of the shaft in the slats and the guide rails unlike in the invention of Patent Document 2.

Further, since no guide rails are provided unlike in the invention of Patent Document 2 and the movable supporting means C moves to a position at which to support the supported means B in the slats 3 from below only when the supported means B passes through the course change path part, it is possible to make an inverting action required in the case of recovery from a pinch accident by temporary inversion or conducting work with forward and backward movements without having to provide such a complicated mechanism as the lower open/close device described in Patent Document 2.

Moreover, since the movable supporting means C operates in conjunction with movement of the endless chains 2C, the movable supporting means C is also driven by the drive device (decelerator-equipped motor M or the like) for the endless chains 2C, which eliminates the need to provide a separate drive device for the movable supporting means C.

When the supported means B is the roller 4 and the movable supporting means C is configured to support the roller 4 by the free end portion of the lever 5 that is axially supported at the base end portion and is repeatedly swung by the cam 8, the supported means B provided at the slats 3 is the roller 4, and thus the slats 3 operate smoothly without a hitch or abrasion, and the simplified cam mechanism realizes stable and reliable operations.

In addition, since the load-receiving rollers 3A, 3A, . . . are provided at front, back, right, and left sides of the lower surfaces of the slats and the load-receiving rollers 3A, 3A, . . . are supported by guide rails G1, G1 disposed at the conveyance path part T, no load acts on the supported means B (roller 4) in the slats 3, which makes it possible to reduce the supported means B (roller 4) in size.

Therefore, the movable supporting means C (lever 5 that is axially supported at the base end thereof and is swung back and forth by the cam 8) can be made compact, and it is possible to manufacture the apparatus in low-floor fashion and at lower costs.

Further, the load of the slats 3, 3, . . . is borne by the guide rails G1, G1, not the chain rollers, at the conveyance path part T, and thus the chain rollers are subjected to only tension. This makes it possible to reduce the chains in size and reduce manufacturing costs.

Moreover, the load-receiving rollers 3A, 3A, . . . are provided at the front, back, right, and left sides of the lower surfaces of the slats 3, and thus even if any foreign object or liquid drops from above to the slats 3, it does not fall on the load-receiving rollers 3A, 3A, . . . , which makes it possible to prevent abrasion and corrosion of the load-receiving rollers 3A, 3A, . . . .

REFERENCE SIGNS LIST

A Vertical circulation path
B Supported means
C Movable supporting means
D Offset
E Center of coupling pin
F Direction of conveyance
FL Floor surface
G1, G2 Guide rail
H Coupling position (center of end portion coupling shaft)
J Gap
L Line connecting centers of coupling pins
M Decelerator-equipped motor
T Conveyance path part
R Return path part
C1, C2 Course change path part
W Subject to be conveyed
1 Slat conveyor apparatus
2A, 2B Sprocket
2C Endless chain
3 Slat
3A Load-receiving roller
3B Side plate
4 Roller
5 Swing lever
5A Cut-out
6 Swing lever (cam follower)
6A Long hole
7 Coupling shaft
8 Cam
8A Cam roller
9A, 9B Interlock sprocket
9C Interlock chain
10A, 10B Interlock sprocket
10C Interlock chain
11A, 11B Drive input sprocket
11C Drive input chain
12A, 12B Drive sprocket
12C Drive chain
13 End portion coupling shaft
14 Link plate
15 Spinning disk
15A Projection

The invention claimed is:

1. A slat conveyor apparatus configured to have a vertical circulation path in Which a conveyance path part and a return path part linearly arranged one above the other are connected at end portions thereof by course change path parts to convey a subject to be conveyed by the conveyance path part while moving a large number of slats by endless chains, and move the slats on the course change path parts without inverting the upper and lower sides of the slats, wherein the endless chains are connected to either one of front and back ends of the slats in a traveling direction and a supported means to be supported at the course change path parts is provided to the other ends of the slats,
a movable supporting means is provided to at least one of the course change path parts at front and back sides of the traveling direction of the slats to support the supported means from below and hold the slats in the horizontal posture, and the movable supporting means repeatedly travels back and forth in the vertical direction between the end portion of the conveyance path part and the end portion of the return path part in conjunction with movement of the endless chains and moves to a position at which to support the supported means from below only when the supported means passes through the course change path parts.

2. The slat conveyor apparatus according to claim 1, wherein the supported means is a roller, and the movable supporting means is configured to support the roller by a free end portion a lever that is axially supported at a base end thereof and is swung back and forth by a cam.

3. The slat conveyor apparatus according to claim 1, wherein load-receiving rollers are provided at front, back, right, and left sides of the lower surfaces of the slats, and the load-receiving rollers are supported by guide rails disposed at the conveyance path part.

4. The slat conveyor apparatus according to claim 1, wherein the slats are each formed by a steel plate rectangular in a plane view having side plates folded at a sharp angle at the front and back sides of the traveling direction, and coupling position between the slats and the endless chains is offset more outward than the line connecting the centers of coupling pins for coupling link plates of the endless chains.

5. The slat conveyor apparatus according to claim 2, wherein load-receiving rollers are provided at front, back, right, and left sides of the lower surfaces of the slats, and the load-receiving rollers are supported by guide rails disposed at the conveyance path part.

6. The slat conveyor apparatus according to claim 2, wherein the slats are each formed by a steel plate rectangular in a plane view having side plates folded at a sharp angle at the front and back sides of the traveling direction, and coupling position between the slats and the endless chains is offset more outward than the line connecting the centers of coupling pins for coupling link plates of the endless chains.

7. The slat conveyor apparatus according to claim 3, wherein the slats are each formed by a steel plate rectangular in a plane view having side plates folded at a sharp angle at the front and back sides of the traveling direction, and coupling position between the slats and the endless chains is offset more outward than the line connecting the centers of coupling pins for coupling link plates of the endless chains.

8. The slat conveyor apparatus according to claim 5, wherein the slats are each formed by a steel plate rectangular in a plane view having side plates folded at a sharp angle at the front and back sides of the traveling direction, and coupling position between the slats and the endless chains is offset more outward than the line connecting the centers of coupling pins for coupling link plates of the endless chains.

* * * * *